US012627109B2

(12) United States Patent
Dietrich et al.

(10) Patent No.: US 12,627,109 B2
(45) Date of Patent: May 12, 2026

(54) SEMI-FINISHED PRODUCT PROVIDED WITH A WINDOW FOR LASER WELDING FOR MANUFACTURING AN ELECTRICAL CONTACT ELEMENT, METHOD FOR MANUFACTURING AN ELECTRICAL CONTACT ELEMENT AND ELECTRICAL CONTACT ELEMENT

(71) Applicant: TE Connectivity Germany GmbH, Bensheim (DE)

(72) Inventors: Willi Dietrich, Bensheim (DE); Soenke Sachs, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 923 days.

(21) Appl. No.: 17/901,945

(22) Filed: Sep. 2, 2022

(65) Prior Publication Data

US 2023/0076105 A1 Mar. 9, 2023

(30) Foreign Application Priority Data

Sep. 3, 2021 (DE) .......................... 102021122892.1

(51) Int. Cl.
*H01R 43/16* (2006.01)
*B23K 26/064* (2014.01)
(Continued)

(52) U.S. Cl.
CPC ......... *H01R 43/16* (2013.01); *B23K 26/0643* (2013.01); *B23K 26/22* (2013.01);
(Continued)

(58) Field of Classification Search
CPC ................ H01R 43/16; H01R 43/0221; B23K 26/0643; B23K 26/22
(Continued)

(56) References Cited

U.S. PATENT DOCUMENTS 7,422,494 B2 * 9/2008 Fry, Jr. ................... H01R 13/04
439/891
7,976,353 B2 * 7/2011 Myer ..................... H01R 13/04
439/891
(Continued)

FOREIGN PATENT DOCUMENTS

CN 102112267 A 6/2011
CN 104659512 A 5/2015
(Continued)

OTHER PUBLICATIONS

Japanese Office Action dated Oct. 3, 2023 with English translation, corresponding to Application No. 2022-137383, 14 pages.
(Continued)

*Primary Examiner* — Peter G Leigh
(74) *Attorney, Agent, or Firm* — Barley Snyder

(57) ABSTRACT
A semi-finished product for manufacturing an electrical contact element includes a first workpiece having a front side and a rear side opposite the front side, a second workpiece, and a window extending through the first work-piece. The first workpiece and the second workpiece are both metallic. The rear side of the first workpiece is closer to the second workpiece than the front side. Through the window, a surface of the second workpiece is accessible from the first workpiece. The window has a base area that, starting at the front side of the first workpiece, increases toward the second workpiece.

19 Claims, 4 Drawing Sheets

(51) Int. Cl.

| | | |
|---|---|---|
| *B23K 26/22* | (2006.01) | |
| *H01R 13/187* | (2006.01) | |
| *H01R 43/02* | (2006.01) | |
| *B23K 101/38* | (2006.01) | |

(52) U.S. Cl.
CPC ....... *H01R 13/187* (2013.01); *H01R 43/0221*
(2013.01); *B23K 2101/38* (2018.08)

(58) Field of Classification Search
USPC ........................................................ 439/891
See application file for complete search history.

(56) References Cited

U.S. PATENT DOCUMENTS

| | | | |
|---|---|---|---|
| 9,673,438 B2 | 6/2017 | Jeong et al. | |
| 9,799,976 B2 | 10/2017 | Lehner et al. | |
| 2009/0314753 A1 | 12/2009 | Kosmowski | |
| 2010/0193002 A1 | 8/2010 | Dimroth et al. | |
| 2015/0140876 A1 | 5/2015 | Lehner et al. | |
| 2015/0228957 A1* | 8/2015 | Jeong ................. | H01M 50/503 |
| | | | 219/121.64 |
| 2016/0061727 A1 | 3/2016 | Kobayashi et al. | |
| 2016/0352033 A1 | 12/2016 | Sachs et al. | |
| 2016/0372881 A1* | 12/2016 | Bauer ................... | B23K 26/20 |
| 2018/0183157 A1 | 6/2018 | Schneider et al. | |
| 2018/0281110 A1 | 10/2018 | Newman | |
| 2019/0038160 A1 | 2/2019 | Schmidt et al. | |
| 2019/0173214 A1 | 6/2019 | Leidner et al. | |

FOREIGN PATENT DOCUMENTS

| | | | | | |
|---|---|---|---|---|---|
| CN | 104835934 A | | 8/2015 | | |
| CN | 105102173 A | | 11/2015 | | |
| CN | 105102173 B | * | 11/2016 | ........... | G01N 33/205 |
| CN | 106207500 A | | 12/2016 | | |
| CN | 108258441 A | | 7/2018 | | |
| CN | 110870142 A | | 3/2020 | | |
| DE | 102015103003 B3 | * | 10/2015 | ........... | H01H 11/041 |
| EP | 1006613 A1 | * | 6/2000 | ............ | H01R 4/188 |
| EP | 2147480 B1 | * | 6/2012 | ............ | H01R 13/04 |
| EP | 2873786 A1 | | 11/2014 | | |
| JP | S63140786 A | | 6/1988 | | |
| JP | H01162588 A | | 6/1989 | | |
| JP | H06020736 A | | 1/1994 | | |
| JP | 2001146187 A | | 5/2001 | | |
| JP | 2008173657 A | | 7/2008 | | |
| JP | 2013062230 A | * | 4/2013 | | |
| JP | 2015111569 A | | 6/2015 | | |
| JP | 2015149282 A | * | 8/2015 | ............ | B23K 26/20 |
| JP | 6566544 B2 | | 8/2019 | | |
| WO | WO-2012120774 A1 | * | 9/2012 | ......... | H01M 50/516 |
| WO | 2016139018 A1 | | 9/2016 | | |
| WO | WO-2016147927 A1 | * | 9/2016 | ............ | H01R 43/16 |

OTHER PUBLICATIONS

European Patent Office Examination Report dated Apr. 28, 2025, corresponding to Application No. 22 193 584.4-1201, 14 pages.
Korean Office Action dated Feb. 20, 2025 with English translation, corresponding to Application No. 10-2022-0111489, 8 pages.
Korean Office Action dated Mar. 22, 2024 with English translation, corresponding to Application No. 10-2022-0111489, 15 pages.
Japanese Office Action dated Apr. 2, 2024 with English translation, corresponding to Application No. 2022-137383, 22 pages.
Chinese Office Action dated Sep. 12, 2024 with English translation, corresponding to Application No. 202211061271.9, 14 pages.
European Search Report from the European Patent Office dated Jan. 26, 2023, corresponding to Application No. 22193584.4-1201, 35 pages.

\* cited by examiner

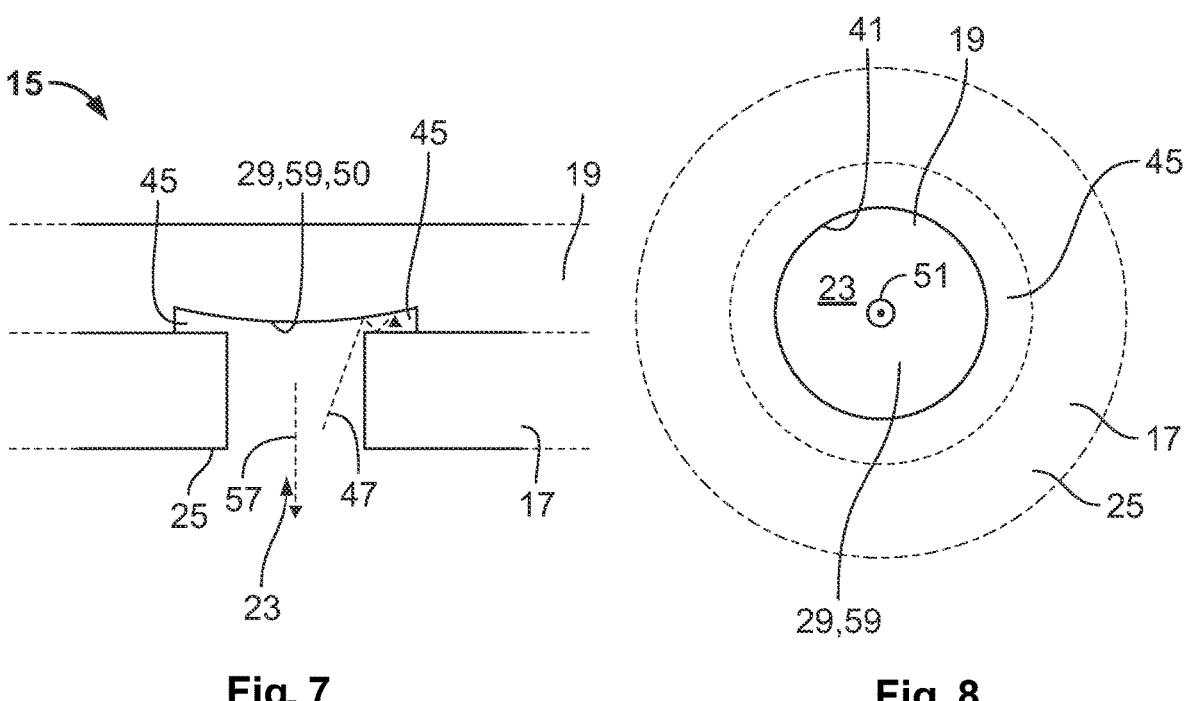
Fig. 7
Fig. 8
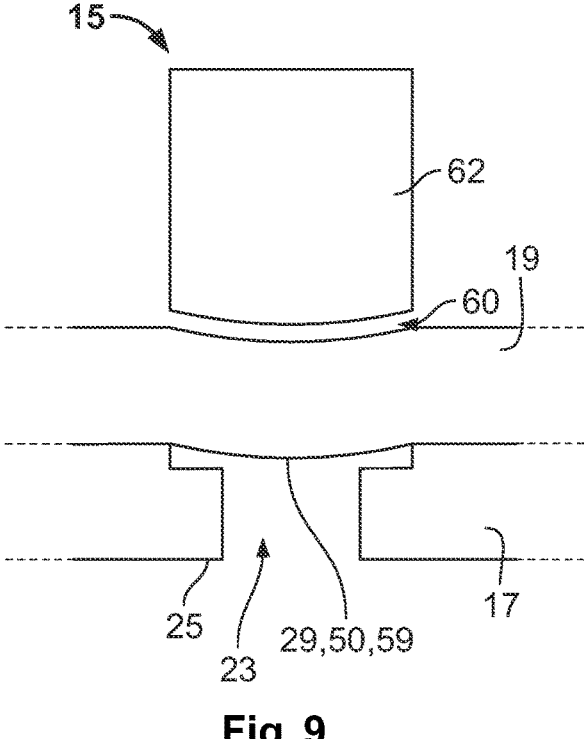
Fig. 9

SEMI-FINISHED PRODUCT PROVIDED WITH A WINDOW FOR LASER WELDING FOR MANUFACTURING AN ELECTRICAL CONTACT ELEMENT, METHOD FOR MANUFACTURING AN ELECTRICAL CONTACT ELEMENT AND ELECTRICAL CONTACT ELEMENT

CROSS-REFERENCE TO RELATED APPLICATIONS

This application claims the benefit of the filing date under 35 U.S.C. § 119(a)-(d) of German Patent Application No. 102021122892.1, filed on Sep. 3, 2021.

FIELD OF THE INVENTION

The invention relates to a semi-finished product for manufacturing an electrical contact element and a method for joining a first metallic workpiece with a second metallic workpiece by way of laser welding.

BACKGROUND

Electrical contact elements are known. They can be used to establish an electrically conductive connection in connectors. An electrical contact element can comprise, for example, a contact pin or a receptacle for a contact pin. Electrical contact elements are often composed of several parts. This allows the individual parts to be manufactured according to the properties demanded, such as electrical conductivity, corrosion resistance, abrasion resistance, or elasticity.

The two parts are referred to as workpieces during the manufacture of the electrical contact element. In general, the two workpieces are manufactured separately to a certain extent and mated or joined at a certain point in time in the manufacturing process. The arrangement of the workpieces that are mated or joined or to be joined is referred to as a semi-finished product, regardless of the degree of completion of the individual workpieces. The electrical contact element is then manufactured from the semi-finished product. Depending on the field of use of the electrical contact element, it can be necessary for the two parts of the contact element to be electrically conductively and/or mechanically connected to one another. In particular, in mass production, this connection can be complex and therefore expensive.

SUMMARY

A semi-finished product for manufacturing an electrical contact element includes a first workpiece having a front side and a rear side opposite the front side, a second workpiece, and a window extending through the first workpiece. The first workpiece and the second workpiece are both metallic. The rear side of the first workpiece is closer to the second workpiece than the front side. Through the window, a surface of the second workpiece is accessible from the first workpiece. The window has a base area that, starting at the front side of the first workpiece, increases toward the second workpiece.

BRIEF DESCRIPTION OF THE DRAWINGS

The invention will now be described by way of example with reference to the accompanying Figures, of which:

FIG. 7 is a schematic detail view of a window according to a third embodiment;

FIG. 8 is a top view of the window of FIG. 7;

FIG. 9 is a schematic detail view of a semi-finished product according to another embodiment.

DETAILED DESCRIPTION OF THE EMBODIMENT(S)

Figure 1:
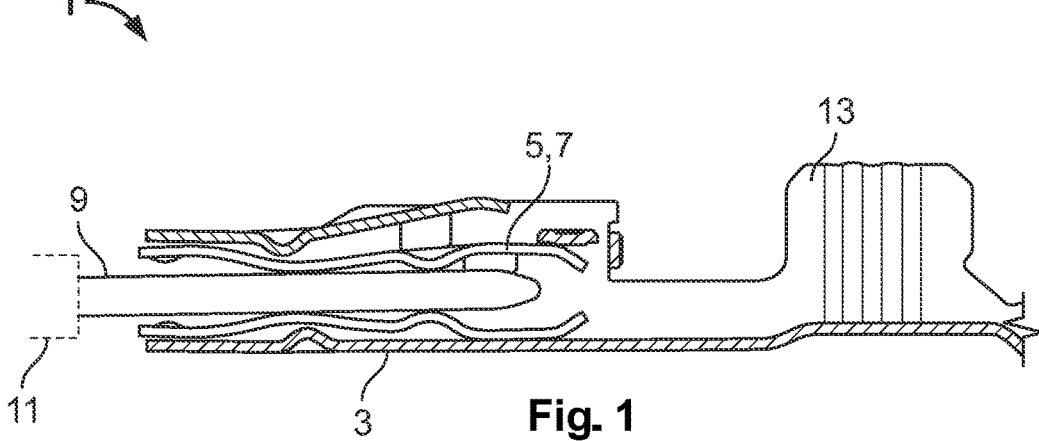
FIG. 1 is a sectional side view of an electrical contact element according to an embodiment.

The invention shall be explained hereafter in more detail by way of example using embodiments with reference to the drawings. The feature combinations illustrated in the embodiments by way of example can be supplemented by further features in accordance with the properties of the devices of the invention that are demanded for a specific application. Individual features can also be omitted in the embodiments described if the effect of this feature is irrelevant for a specific case of application. The same reference numerals in the drawings are used for elements having the same function and/or the same structure.

FIG. 1 shows an electrical contact element 1 merely by way of example in a longitudinal sectional view and schematically. The electrical contact element 1 is composed of two parts, a contact body 3 and a contact part 5 arranged within contact body 3. Contact part 5 is shown only by way example as a spring 7 which can receive a contact part 9 of a mating contact element 11 configured to be complementary (in FIG. 1 indicated by dashed lines) to establish an electrically conductive connection thereto. As an alternative, electrical contact element 1 can comprise a pin, a flat contact, or any other suitable structure instead of a spring 7.

The contact body 3 can form a cage for the contact part 5 and, for example, assume a support function. Contact body 3 comprises crimping wings 13 for connecting contact element 1 to an electrical line. Contact body 3 consequently serves not only to receive contact part 5, but also to provide the electrical connection between a line received in crimping wings 13 and contact part 5.

In order to produce a sufficiently good electrical connection between contact part 5 and contact body 3, which is additionally permanent and not at risk of corrosion, the two parts 3, 5 are joined with one another by at least one weld spot. This shall be discussed in detail below.

Figure 2:
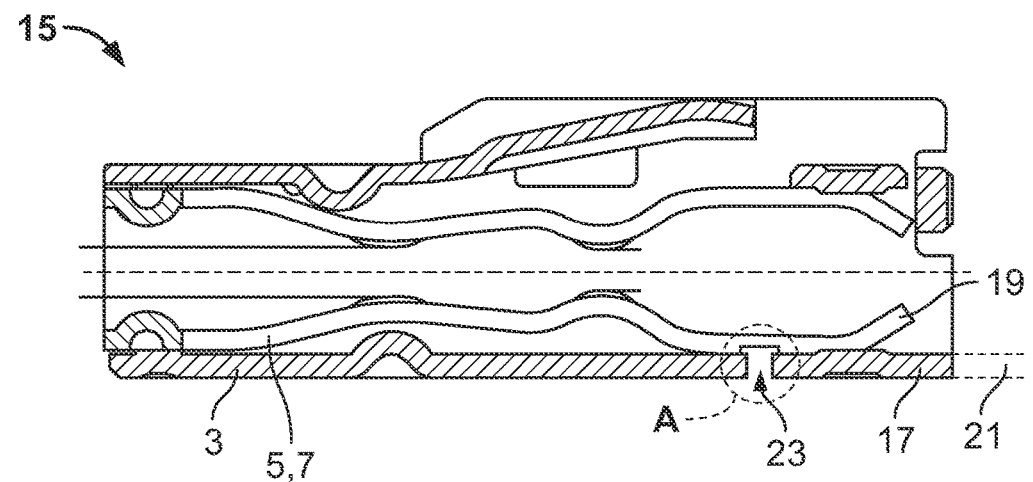
FIG. 2 is a sectional side view of a semi-finished product for producing the electrical contact element.

FIG. 2 shows a detail of a semi-finished product 15 in a longitudinal sectional view. Semi-finished product 15 shown in FIG. 2 can be used to produce an electrical contact element 1 which is structured similarly to contact element 1 described with reference to FIG. 1.

Semi-finished product 15 comprises a first metallic workpiece 17 and a second metallic workpiece 19. First metallic workpiece 17 is shown only by way of example such that it can form a contact body 3 for later contact element 1.

Second workpiece 19 is also shown only by way of example such that it can form a contact part 5 in the form of a spring 7.

Semi-finished product 15 shown in FIG. 2 is characterized in that it has not yet been completely manufactured to form contact element 1. Two workpieces 17 and 19 are already placed one inside the other in the state shown in FIG. 2, but are not yet joined with one another by at least one weld spot.

As an alternative to the shape of semi-finished product 15 shown in FIG. 2, in which parts 17 and 19 are already largely pre-formed, it is also conceivable that one of the two workpieces, in particular first workpiece 17, is a piece of sheet metal 21 (indicated in FIG. 2 by dashed lines) which has not yet been formed to become contact body 3 in the sense of the example described above. For example, a pre-formed part, in particular contact part 5, can be joined as a second workpiece 19 with piece of sheet metal 21 that has not yet been joined by a welded connection. The contact part 5 can be formed, for example, by a pin, a flat contact, or a spring. The contact part 5 can be that part of the contact element which comes into indirect contact with a mating contact element to establish an electrical connection.

As an alternative to the configuration mentioned above, the contact body 3 can also be formed from the second workpiece 19 and, correspondingly, the contact part 5 can be formed from the first workpiece 17. The respective association depends on the geometry of the parts.

First workpiece 17 or piece of sheet metal 21 can then be made to assume the required shape, for example, a contact body 3, by metal forming. The piece of sheet metal can already be pre-punched and optionally also be pre-formed at least in sections. The invention makes it possible to join an already pre-formed part with a part that has at least not yet been completely made to assume a desired shape by forming. The part, which has not yet been pre-formed or has not yet been pre-formed completely, can be made to assume the desired shape by bending or other metal forming processes once the two workpieces 17, 19 have been joined with one another by laser welding.

As an alternative to the joining described above of a pre-formed part with a part that has not yet been pre-formed, both workpieces 17, 19 can also be made of sheet metal that has not yet been pre-formed completely or of other blanks or semi-finished products. A further alternative is that both parts are pre-formed, in particular by punching and bending, and are placed against and/or inside one another and then joined with one another by laser welding. In this case, both workpieces are pre-formed parts, in particular parts of a contact element. A further method step can be that the two workpieces 17, 19 are placed against or into one another as pre-formed parts to form a semi-finished product and are subsequently joined with one another by producing at least one weld spot as described below using laser welding.

Figure 3:
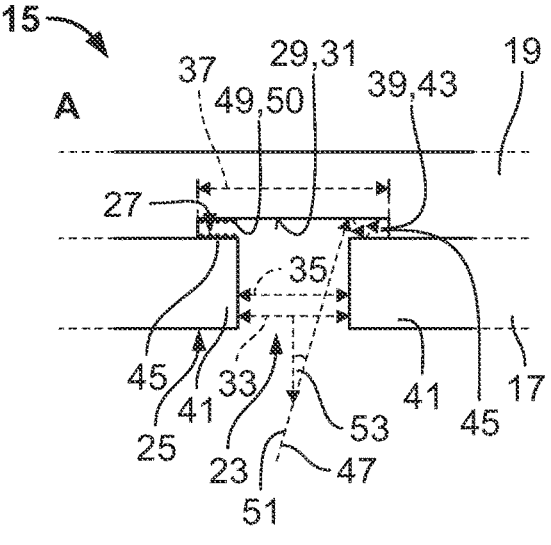
FIG. 3 is a schematic detail view of a semi-finished product in a region of a window.

In order to join two workpieces 17 and 19 by way of a welded connection, a window 23 is provided, as shown in FIG. 2, which extends through first workpiece 17 in the direction of second workpiece 19 and possibly into second workpiece 19. An enlarged representation of the region marked A from FIG. 2 is shown in FIG. 3. Window 23 is described hereafter with reference to FIGS. 2 and 3. The method according to the invention can be further improved in that the window 23 is created in the first workpiece 17 and/or in the first and in the second workpiece 17, 19 before laser welding. The window 23 can be created, for example, by punching or other methods.

First workpiece 17 has a front side 25 and a rear side 27 disposed opposite front side 25, as shown in FIG. 3. In the semifinished product 15, rear side 27 of first workpiece 17 is arranged closer to second workpiece 19. Rear side 27 may be in contact with second workpiece 19, at least in a region surrounding window 23. In the context of this description, the term "window" 23 refers to the entire cavity which, starting from front side 25 of first workpiece 17, extends into semi-finished product 15.

The window 23 extends end-to-end through first workpiece 17. In the example shown in FIG. 3, window 23 extends into second workpiece 19 as well. A surface 29 of second workpiece 19 is exposed to the outside through window 23. Surface 29 is accessible from the outside through window 23. Surface 29 is accessible from the outside solely through window 23. Surface 29 represents a reflection surface 31 for laser light.

Window 23 has a base area 33. Base area 33 increases toward second workpiece 19. In other words, an inner dimension 35 of window 23 on front side 25 is less than an inner dimension 37 at a point spaced from front side 25. Window 23 has the greater inner dimension 37 in second workpiece 19. In the embodiment shown by way of example, the enlargement of base area 33 occurs abruptly so that an undercut 39 is formed in second workpiece 19. In other words, as shown in FIG. 3, a gap 43 extends between a boundary 41 surrounding window 23 on front side 25 and surface 29 accessible through window 23. Gap 43 can also be referred to as a niche or recess.

The term "window" refers to the passage opening that extends at least through the first workpiece 17. The passage opening or the window 23, respectively, can also extend at least in sections into the material of the second workpiece 19. The term "base area" of the window 23 can be used synonymously with the term "window area". The enlargement of the base area 33 of the window 23 can be sudden or continuous. The enlargement of the window 23 towards the second workpiece 19 can also be described in that an inner dimension of the window 23 is greater at a position spaced from the front side 25 of the first workpiece 17 than at the front side 25 of the first workpiece 17. The position spaced from the front side 25 is disposed closer to the second workpiece 19 than the front side of the first workpiece 17, or in the second workpiece 19.

When carrying out the method according to the invention, the two workpieces 17, 19 to be joined with one another are the two workpieces of a semi-finished product 15 according to the invention. In the case of the semi-finished product 15 according to the invention and/or during the implementation of the method according to the invention, the rear side of the first workpiece 17 may be in abutment against the second workpiece 19, at least in the vicinity of the window 23. In the following, the terms laser beam and laser light are used synonymously. The surface of the second workpiece 19 that is accessible through the window 23 can also be considered, at least in sections, as a reflection surface for the laser beam.

Gap 43 can serve as a light trap 45 for trapping laser light. Light trap 45 provides a cavity in which laser light can be reflected from surface 29 onto rear side 27 of first workpiece 17. The light trap 45 extends between a boundary surrounding the window 23 on the front side 25 of the first workpiece 17 and the surface 29 of the second workpiece 19 that is accessible through the window 23. This light trap 45, or also light trapping volume, is a volume disposed between two oppositely disposed surfaces of the workpieces 17, 19 in which a laser beam can be trapped and absorbed during laser welding. In particular, the laser light can be reflected multiple times between surface 29 and rear side 27.

The light trap 45 can also accommodate the melt created by heating the two workpieces 17, 19. As the laser light is absorbed, the materials of both workpieces 17 and 19 are melted and joined with one another. This can create a weld spot.

The at least one light trap 45 can form a niche between the two workpieces 17, 19. The niche can have the shape, in particular, of a gap or a recess. The light trap 45 can also be described as an undercut in the material of the first and/or the second workpiece 17, 19 extending from the window 23. A surface of the rear side of the first workpiece 17 in the region of the light trap 45 is plane-parallel with the front side of the first workpiece 17 in an embodiment. However, this is not mandatory.

A laser beam 47 is shown in dashed lines in FIG. 3 to illustrate the method according to the invention. It is reflected at surface 29 serving as a reflection surface 31 onto rear side 27 of first workpiece 17 and is reflected back again therefrom onto surface 29. Further reflections between both surfaces can follow.

A large part of the energy radiated in is absorbed by these multiple reflections. As a result, the materials of both workpieces 17 and 19 heat up and a weld connection is created. The laser beam 47 can be directed onto different positions of surface 29 in succession or continuously. It is also possible for several laser beams to be directed onto different positions of surface 29 at the same time. For the sake of clarity, however, only one laser beam 47 is shown in FIG. 3.

In order to increase the absorption of laser light 47 in the surfaces defining light trap 45, surface 29 and/or rear side 27 can be structured, at least in the region of light trap 45. A microstructure 49 is indicated in FIG. 3. The microstructure 49 can be obtained, for example, by embossing, etching, electron beam bombardment, or engraving. Microstructure 49 can, for example, increase the roughness of the surface of at least one of workpieces 17 and 19 and thereby improve the absorption of the laser light. Microstructure 49 represents one form of a surface structure 50.

Laser beam 47 may extend perpendicular to gap 43 spanned by light trap 45. In other words, laser beam 47 may extend substantially parallel to a surface normal 51 of base area 33. In this sense, substantially parallel is to mean at an angle 53 of less than 45°. As a result, the two workpieces 17, 19 can also be welded to one another if a complicated structure of the contact element to be produced prevents flat irradiation.

Figure 4:
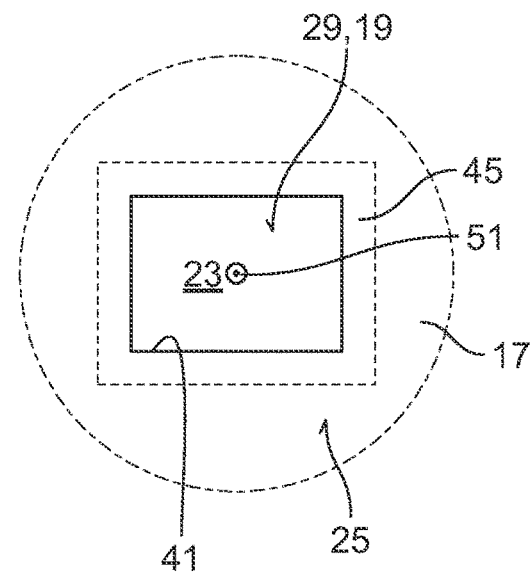
FIG. 4 is a top view of the window of FIG. 3.

FIG. 4 shows a top view onto a region of window 23 viewed along surface normal 51. Window 23 can have an overall rectangular cross-section. As an alternative thereto, other cross sections, for example, polygonal, circular, ellipsoidal, triangular, slit-shaped, or other cross sections are also possible. When viewed along surface normal 51, light trap 45 extends behind the material of first workpiece 17. This is indicated by the dotted line in FIG. 4.

The window 23 can have an inner dimension that is only insignificantly larger than the diameter of the laser beam 47 for laser welding. For example, the window 23 can have an inner dimension that is smaller than 1.5 times, or smaller than 1.3 times the diameter of the laser beam 47 for laser welding.

Figure 5:
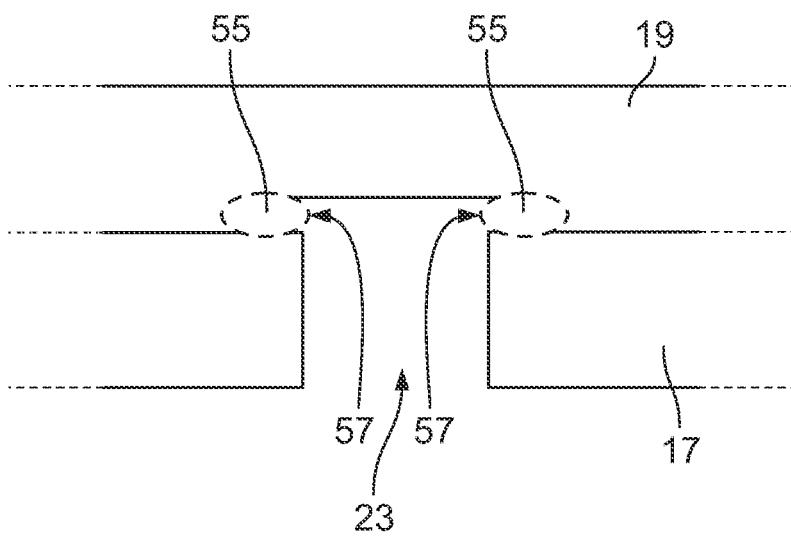
FIG. 5 is a schematic detail view of the window of FIG. 3 with weld points introduced.

FIG. 5 shows the window from FIGS. 3 and 4 after laser welding. There is now at least one weld spot 55 disposed in the region in which light trap 45 was previously located. Two weld spots 55 are indicated in FIG. 5. One or more punctiform weld spots 55 can be formed. The at least one weld spot 55 can form a material joint between the two workpieces 17, 19 at an edge of the window 23. It is also possible for end-to-end weld spots 55 to be formed which extend entirely or in part along original light trap 45 around window 23. Melting the materials of both workpieces 17, 19 can fill the light trap 45 so that it no longer exists as a cavity.

Weld spots 55 are caused by the materials of two workpieces 17 and 19 melting and subsequent cooling down. Weld spots 55 form a permanent electrically conductive and mechanical connection between the two workpieces 17 and 19. Weld spots 55 are disposed at an edge of window 57.

In the electrical contact element 1, the contact part 5 is arranged at least in part within the contact body 3 and is joined with the contact body 3 in a positive substance-fit manner by at least one weld spot 55, i.e. forming a material joint between the at least one contact part 5 and the contact body 3.

The laser beam 47 radiated into the window 23 and reflected at the surface of the second workpiece 19 is not reflected out of the window 23 again, but is reflected onto the rear side 27 of the first workpiece 17. In this region, both workpieces 17, 19 are heated by the laser beam 47 so that they can fuse together at one edge of the window 23 and create a weld spot. The solution according to the invention is particularly useful when lateral irradiation into a gap located between the two workpieces 17, 19 is not possible due to the geometry of one or both workpieces 17, 19. Due to the welded connection of the two workpieces 17, 19 to one another, the prior coating of one or both workpieces 17, 19 can be dispensed with. At least in the region where the two workpieces 17, 19 are in contact, a coating can be dispensed with, which would otherwise be necessary to ensure a permanently good electrical connection between the two workpieces 17, 19 and to prevent corrosion. As a result, manufacturing can be simplified and costs reduced.

The metallic workpieces 17, 19 can be made from different or from the same metallic materials. Metallic materials mean pure metals as well as alloys of various metals. For example, one of the workpieces can be made of steel and the other can be made of copper or an alloy containing copper. The invention can also join together workpieces 17, 19 made of metallic materials which, as is known, are difficult to electrically join by way of a purely mechanical contact. An example of this is aluminum which can lose its conductivity at the surface due to the formation of oxide layers. By welding the two metallic workpieces together, this problem can be prevented even if one or both of the workpieces is/are made of aluminum or an alloy containing aluminum.

Figure 6:
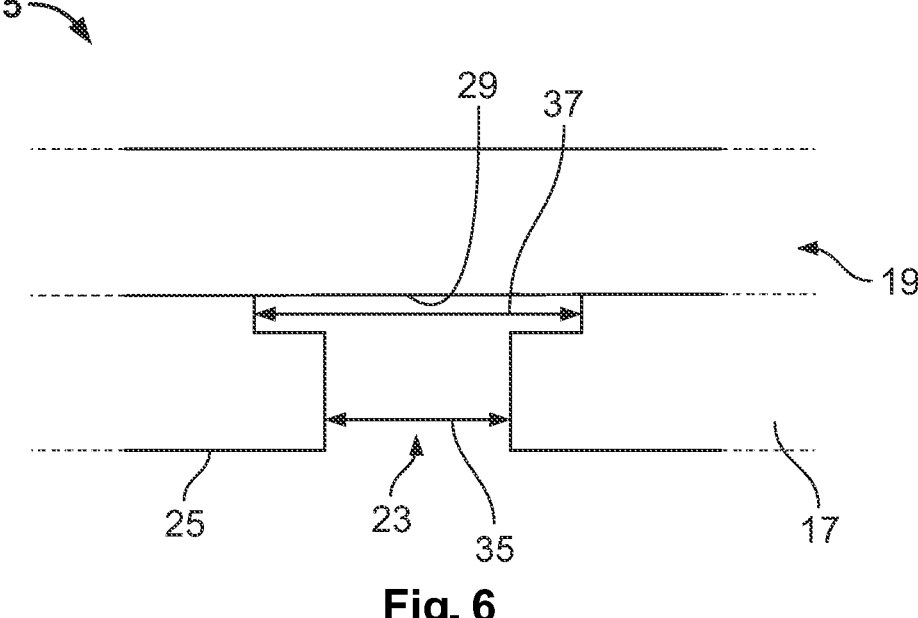
FIG. 6 is a schematic detail view of a window according to a second embodiment.

FIG. 6 shows a second embodiment of a window 23 according to the invention in a part of a semi-finished product 15. Only the differences from the embodiment described above with reference to FIGS. 3 to 5 shall be discussed hereafter.

When viewed in a direction transverse to surface normal 51, as shown in the embodiment of FIG. 6, window 23 has a cross section similar to window 23 described in the preceding embodiment. However, window 23 in the embodiment of FIG. 6 is disposed only in first workpiece 17 and exposes surface 29 of second workpiece 19. In other words, window 23 is formed as a two-stage bore in first workpiece 17 in which a first stage with a smaller diameter, which corresponds to inner dimension 35, extends from front side 25 into workpiece 17, and a second stage, starting out from the first stage through rear side 27, wherein the second stage has a larger diameter corresponding to inner dimension 37. In this embodiment, the formation of a recess in second workpiece 19 can be dispensed with.

A further advantageous embodiment of a window 23 for a semi-finished product 15 is described hereafter with reference to FIGS. 7 and 8. Here as well, only the differences from the embodiment described with reference to FIGS. 3 to 5 have been discussed for the sake of brevity.

In the embodiment shown in FIGS. 7 and 8, window 23 extends substantially similarly to the first embodiment through first workpiece 17 into second workpiece 19. The difference from the first embodiment is that second workpiece 19 is provided with a structured surface 29 in the form of a convex curvature 59. Convex curvature 59 represents a further form of a surface structure 50. Convex curvature 50 can be combined with a microstructure 49, as is described with reference to FIG. 3.

Convex curvature 59 projects towards front side 25 of first workpiece 17. Convex curvature 29 can facilitate directing a laser beam 47 into light trap 45. A laser beam 47 with multiple reflections is indicated in FIG. 7 by dashed lines.

A further embodiment of a semi-finished product 15 is illustrated in FIG. 9. Window 23 is similar to the embodiment described with reference to FIG. 7. This means that window 23 exposes surface 29 of second workpiece 19 which is provided with a surface structure 50 in the form of a convex curvature 59.

In contrast to the embodiment described with reference to FIG. 7, in which second workpiece 19 is provided with surface structure 50 and with light trap 45 and the enlarged inner dimension 37, workpiece 17 in the embodiment of FIG. 9 is provided with increased inner dimension 37.

Convex curvature 59 of surface 29 can be achieved in that the material of second workpiece 19 is bent or embossed towards first workpiece 17 at least in the region of window 23. In other words, second workpiece 19 has an embossing 60 by which convex curvature 59 is formed. Such an embossing 60 can be produced, for example, by a punch 62 which is shown schematically in FIG. 9. Embossing 60 can take place before or after workpieces 17 and 19 have been positioned relative to one another.

Figure 10:
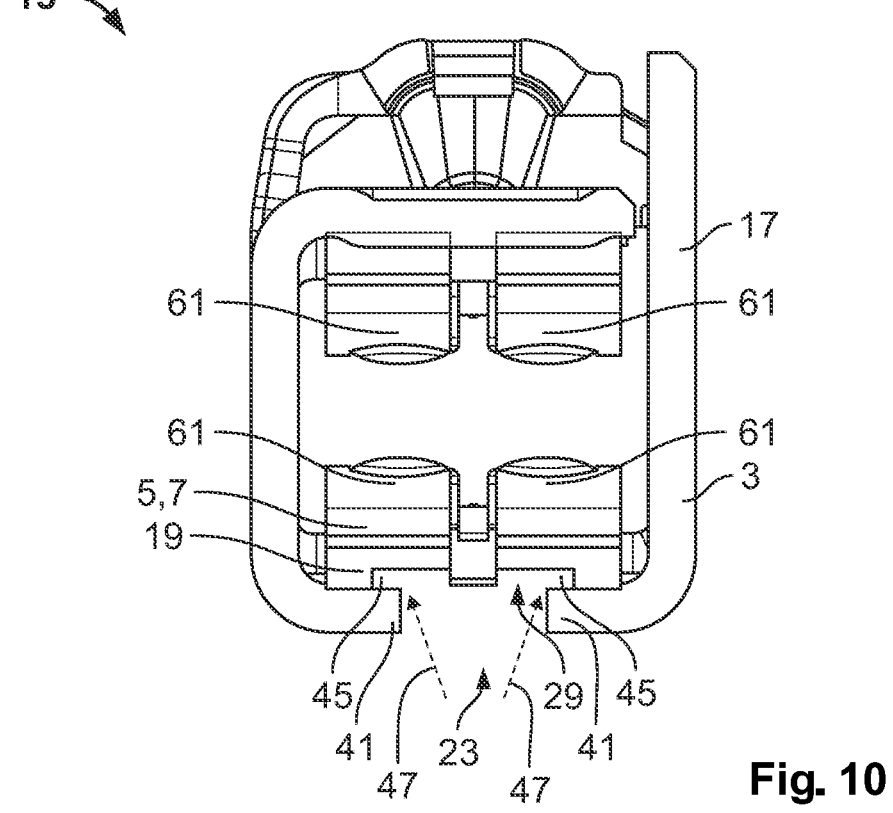
FIG. 10 is a schematic sectional view of a semi-finished product according to another embodiment.

A further embodiment of a semi-finished product 15 is illustrated in FIG. 10 in a cross section. Semi-finished product 15 comprises a first workpiece 17 which forms a contact body 3 and a second workpiece 19 which forms a contact part 5 shaped as a spring 7. Spring 7 has several slats 61.

Contact part 5 can be used for the connection to a flat contact which is contacted by slats 61 when the flat contact is used in later contact element 1. A window 23 extends through first workpiece 17 and exposes surface 29 of two adjacent slats 61 of spring 7. A light trap 45 is formed between each slat 61 and boundary 41 of window 22. Two laser beams 47 can be fired through the window into light traps 45 at the same time in order to weld both slats 61 to first workpiece 17 at the same time. As an alternative, laser beams 47 can also be fired through window 47 successively. In order to simultaneously generate two laser beams 47 for laser welding, a single laser beam can be emitted through a bifocal lens and thus split.

The solution according to the invention allows for the two metal workpieces 17, 19 to be joined with one another to be joined quickly and easily by way of laser welding.

The at least one window 23 can also be used for quality assurance. Prior to welding, the window 23 can be used to examine the exposed surface 29 of the second workpiece 19 and/or to examine the weld joint produced after welding.

What is claimed is:

1. A semi-finished product for manufacturing an electrical contact element, comprising:
   a first workpiece having a front side and a rear side opposite the front side;
   a second workpiece, the first workpiece and the second workpiece are both metallic, the rear side of the first workpiece is closer to the second workpiece than the front side; and
   a window extending through the first workpiece and through which a surface of the second workpiece is accessible from the first workpiece, the window has a base area that, starting at the front side of the first workpiece, increases toward the second workpiece, the surface of the second workpiece that is accessible through the window is within an undercut formed in the second workpiece.

2. The semi-finished product of claim 1, wherein a light trap extends between a boundary surrounding the window on the front side of the first workpiece and the surface of the second workpiece that is accessible through the window.

3. The semi-finished product of claim 2, wherein the light trap forms a gap between the first workpiece and the second workpiece.

4. The semi-finished product of claim 2, wherein a surface of the first workpiece defining the light trap has a microstructure.

5. The semi-finished product of claim 1, wherein one of the first workpiece and the second workpiece is a piece of sheet metal.

6. The semi-finished product of claim 5, wherein the other of the first workpiece and the second workpiece is a contact part for the electrical contact element.

7. The semi-finished product of claim 1, wherein the surface of the second workpiece that is accessible through the window has a surface structure.

8. The semi-finished product of claim 7, wherein the surface of the second workpiece that is accessible through the window has a convex curvature.

9. The semi-finished product of claim 7, wherein the surface of the second workpiece that is accessible through the window has a microstructure.

10. An electrical contact element, comprising:
    a semi-finished product including:
       a first workpiece having a front side and a rear side opposite the front side;
       a second workpiece, the first workpiece and the second workpiece are both metallic, the rear side of the first workpiece is closer to the second workpiece than the front side; and
       a window extending through the first workpiece and through which a surface of the second workpiece is accessible from the first workpiece, the window has a base area that, starting at the front side of the first workpiece, increases toward the second workpiece, the surface of the second workpiece that is accessible through the window is within an undercut formed in the second workpiece.

11. The electrical contact element of claim 10, wherein the first workpiece is joined with the second workpiece in a positive substance-fit manner at an edge of the window by a weld spot.

12. The electrical contact element of claim 10, wherein the first workpiece is a contact body and the second workpiece is a contact part.

13. The electrical contact element of claim 12, wherein the contact body is formed from a piece of sheet metal by metal forming.

14. The electrical contact element of claim 12, wherein the contact part is arranged at least in part in the contact body and is joined to the contact body by a weld spot.

15. A method for joining, comprising:

providing a first workpiece having a front side and a rear side opposite the front side;

providing a second workpiece;

arranging the rear side of the first workpiece closer to the second workpiece than the front side; and directing a laser beam through a window extending at least through the first workpiece onto the second workpiece, the laser beam is reflected from the second workpiece onto the rear side of the first workpiece, the window on the front side of the first workpiece has a base area and a surface normal that is perpendicular to the base area, an angle of less than 45° is formed between the laser beam and the surface normal.

16. The method of claim 15, wherein one of the first workpiece and the second workpiece is a piece of sheet metal and the other of the first workpiece and the second workpiece is a pre-formed contact part for an electrical contact element.

17. The method of claim 16, further comprising joining the pre-formed contact part with the piece of sheet metal at a weld spot by laser welding.

18. The method of claim 17, wherein the piece of sheet metal is shaped around the pre-formed contact part.

19. The method of claim 15, wherein the first workpiece and the second workpiece are both pre-formed parts and are placed against or into one another to form a semi-finished product before being joined with one another by laser welding a weld spot.

\* \* \* \* \*